United States Patent
Kwok (10) Patent No.: US 9,546,892 B2
(45) Date of Patent: Jan. 17, 2017

(54) METHODS AND SYSTEMS FOR ESTIMATION OF PROPELLANT TRANSFER IN AN ION PROPULSION SYSTEM

(71) Applicant: The Boeing Company, Seal Beach, CA (US)

(72) Inventor: Lloyd C. Kwok, Granada Hills, CA (US)

(73) Assignee: The Boeing Company, Chicago, IL (US)

( * ) Notice: Subject to any disclaimer, the term of this patent is extended or adjusted under 35 U.S.C. 154(b) by 827 days.

(21) Appl. No.: 14/051,123

(22) Filed: Oct. 10, 2013

(65) Prior Publication Data

US 2015/0106039 A1 Apr. 16, 2015

(51) Int. Cl.
*G01F 22/02* (2006.01)
*B64G 1/40* (2006.01)
*F03H 1/00* (2006.01)

(52) U.S. Cl.
CPC ............ *G01F 22/02* (2013.01); *B64G 1/402* (2013.01); *B64G 1/405* (2013.01); *F03H 1/0012* (2013.01)

(58) Field of Classification Search
USPC ........................................................ 702/50
See application file for complete search history.

(56) References Cited

U.S. PATENT DOCUMENTS

| 7,093,800 | B2 | 8/2006 | Salvatore et al. | |
| 7,379,827 | B1 | 5/2008 | Roys | |
| 2011/0017873 | A1* | 1/2011 | Raymond | F02K 9/563 244/172.2 |
| 2013/0119204 | A1* | 5/2013 | Allen | B64G 1/64 244/172.5 |

FOREIGN PATENT DOCUMENTS

FR 2 973 081 A1 9/2012

OTHER PUBLICATIONS

D.G. Fearn, Space Department, Royal Aerospace Establishment, Farnborough, Hants., UK, The Proposed Demonstration of the UK-10 Ion Propulsion System on ESA's SAT-2 Spacecraft, controller, Her Majesty's Stationery office, London, pp. 186-195.*

(Continued)

*Primary Examiner* — Tung Lau
(74) *Attorney, Agent, or Firm* — Armstrong Teasdale LLP (57) ABSTRACT

Methods and systems for estimating propellant transfer in an ion propulsion system are disclosed. One example is a method for estimating transfer of a propellant between a first tank and a second tank in an ion propulsion system during a transfer event. The first tank and the second tank are separated by a valve. A flow rate of the propellant through the valve is calculated based on an initial pressure and an initial temperature of each of the first tank and the second tank for a beginning of the transfer event, calculating, based at least in part on the flow rate, a mass of propellant transferred through the latch over a period of time ending at an intermediate time before an end of the transfer event, and determining an intermediate pressure and temperature for each of the first tank and the second tank for the intermediate time.

20 Claims, 9 Drawing Sheets (56) References Cited

OTHER PUBLICATIONS

Jonah E. Zimmerman, Initial Experimental Investigations of Self-Pressurizing Propellant Dynamics, 48th AIAA/ASME/SAE/ASEE Joint Propulsion Conference & Exhibit Jul. 30-Aug. 1, 2012, Atlanta, Georgia, 23 pages.*
Benjamin S. Waxman, Mass Flow Rate and Isolation Characteristics of Injectors for Use with Self-Pressurizing Oxidizers in Hybrid Rockets, NASA Ames Research Center, Mo_et Field, CA 94035, 49th AIAA/ASME/SAE/ASEE Joint PropulsionConference Jul. 14-17, 2013, San Jose, CA.*
Ganapathi, G.B. et al., "Performance of the Xenon Feed System on Deep Space One," Journal of Spacecraft and Rockets, American Institute of Aeronautics and Astronautics, vol. 37, No. 3, May 1, 2000, pp. 392-398.
Taha et al. "Digital Measurement of the Mass-Flow Rate," Sensors and Actuators A, Elsevier Sequoia S.A., Lausanne, Ch., vol. 45, No. 2, Nov. 1, 1994, pp. 139-143.
European Search Report issued in European Application No. EP 14 18 7923, mailed Apr. 15, 2015.

* cited by examiner

METHODS AND SYSTEMS FOR ESTIMATION OF PROPELLANT TRANSFER IN AN ION PROPULSION SYSTEM

BACKGROUND

The field of the disclosure relates generally to propellant transfer and, more particularly, to methods and systems for estimating propellant transfer in an ion propulsion system.

Some known satellite propulsion systems include two storage tanks separated by a high pressure latch valve. Gas propellant for the satellite's propulsion system is stored in the storage tanks. When propellant is transferred from one storage tank to another, the amount of gas transferred between tanks and the amount of propellant remaining in each tank is estimated. Some known systems use a propellant P-V-T Gauging Tool to estimate the transfer of gas propellant. The latest pressure and temperature sensor reading for each tank are used to determine the volume of propellant in each tank and to retrieve the corresponding fluid density from a properties table. The mass of the gas propellant is calculated based on the calculated volume and retrieved density. During transfer of the gas, these known systems do not update the pressure and temperature profile. Rather, the measurements and calculations described above are performed before the transfer begins, the time to transfer the desired amount of gas propellant is calculated based on the initial estimations, and the calculations are not updated or repeated until after the transfer is completed. During transfer of the gas propellant, temperature and pressure typically change, resulting in changes in the characteristics of the gas propellant and variations in the flow rate of the gas. These changes may lead to inaccuracies in the estimation of the amount of gas transferred.

BRIEF DESCRIPTION

One aspect of the present disclosure is a method for estimating transfer of a propellant between a first tank and a second tank in an ion propulsion system during a transfer event. The first tank and the second tank are separated by a latch valve. The method includes calculating a flow rate of the propellant through the latch valve based on an initial pressure and an initial temperature of each of the first tank and the second tank for a beginning of the transfer event, calculating, based at least in part on the flow rate, a mass of propellant transferred through the latch valve over a period of time ending at an intermediate time before an end of the transfer event, and determining an intermediate pressure for each of the first tank and the second tank for the intermediate time.

In another aspect, a system for use in estimating transfer of a propellant between a first tank and a second tank in an ion propulsion system during a transfer event is described. The system includes a memory device storing characteristics of the propellant, and a processor coupled to the memory device. The processor is configured to calculate a flow rate of the propellant through the latch valve based on an initial pressure and an initial temperature of each of the first tank and the second tank for a beginning of the transfer event, calculate, based at least in part on the flow rate, a mass of propellant transferred through the latch valve over a period of time ending at an intermediate time before an end of the transfer event, and determine an intermediate pressure for each of the first tank and the second tank for the intermediate time.

In yet another aspect, a method for estimating transfer of xenon between a first tank and a second tank in a satellite based xenon ion propulsion system during a transfer event, where the first tank and the second tank are separated by a latch valve, is disclosed. The method includes: (a) calculating a volume of each of the first tank and the second tank based at least in part on a pressure of the xenon in each of the first tank and the second tank; (b) calculating a flow rate of the xenon through the latch valve based on the pressure and a temperature of the xenon in each of the first tank and the second tank; (c) integrating the flow rate over a period of time to determine a mass of xenon transferred through the latch valve over a period of time less than a length of the transfer event; (d) determining a mass of the xenon in each of the first tank and the second tank at an end of the period of time; (e) determining the density and the temperature of the xenon in each of the first and second tanks at the end of the period of time; and (f) determining the pressure of the xenon in each of the first tank and the second tank at the end of the period of time.

The features, functions, and advantages that have been discussed can be achieved independently in various embodiments or may be combined in yet other embodiments further details of which can be seen with reference to the following description and drawings.

DETAILED DESCRIPTION

The subject matter described herein relates generally to propellant transfer between at least two tanks of propellant. More particularly, the subject matter relates to methods and systems for estimating propellant transfer in an ion propulsion system.

In one embodiment, technical effects of the methods, systems, and computer-readable media described herein include at least one of: (a) calculating a flow rate of the propellant through a latch valve based on an initial pressure and an initial temperature of each of a first tank and a second tank for a beginning of a transfer event; (b) calculating, based at least in part on the flow rate, a mass of propellant transferred through the latch valve over a period of time ending at an intermediate time before an end of the transfer event; (c) and determining an intermediate pressure for each of the first tank and the second tank for the intermediate time.

As used herein, an element or step recited in the singular and proceeded with the word "a" or "an" should be understood as not excluding plural elements or steps unless such exclusion is explicitly recited. Furthermore, references to "one implementation" of the present invention or the "exemplary implementation" are not intended to be interpreted as excluding the existence of additional implementations that also incorporate the recited features.

Figure 1:
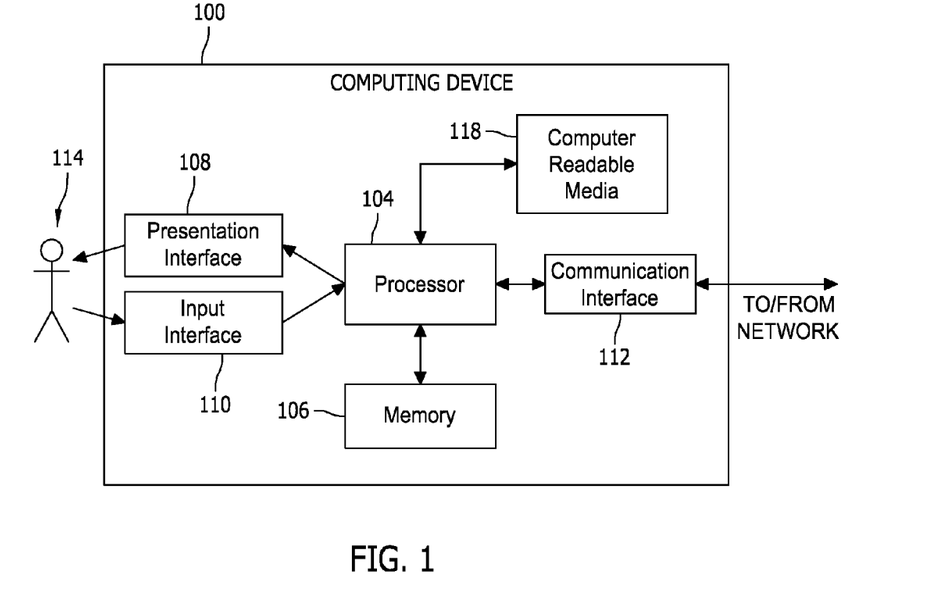
FIG. 1 is a block diagram of an exemplary computing device.

The example methods and systems described herein may be implemented on and/or may include one or more controllers. The controllers may include any suitable combination of analog and/or digital controllers capable of performing as described herein. In some implementations, the controller includes a computing device. FIG. 1 is a block diagram of an exemplary computing device 100 that may be used in a system for estimating propellant transfer. In the exemplary implementation, computing device 100 includes a memory 106 and a processor 104 that is coupled to memory 106 for executing programmed instructions. Processor 104 may include one or more processing units (e.g., in a multi-core configuration). Computing device 100 is programmable to perform one or more operations described herein by programming memory 106 and/or processor 104. For example, processor 104 may be programmed by encoding an operation as one or more executable instructions and providing the executable instructions in memory device 106.

Processor 104 may include, but is not limited to, a general purpose central processing unit (CPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 104, cause processor 104 to perform at least a portion of the methods described herein. The above examples are exemplary only, and thus are not intended to limit in any way the definition and/or meaning of the term processor.

Memory device 106, as described herein, is one or more devices that enable information such as executable instructions and/or other data to be stored and retrieved. Memory device 106 may include one or more computer-readable media, such as, without limitation, dynamic random access memory (DRAM), static random access memory (SRAM), a solid state disk, and/or a hard disk. Memory device 106 may be configured to store, without limitation, maintenance event log, diagnostic entries, fault messages, and/or any other type of data suitable for use with the methods and systems described herein.

In the exemplary implementation, computing device 100 includes a presentation interface 108 that is coupled to processor 104. Presentation interface 108 outputs (e.g., display, print, and/or otherwise output) information such as, but not limited to, installation data, configuration data, test data, error messages, and/or any other type of data to a user 114. For example, presentation interface 108 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some implementations, presentation interface 108 includes more than one display device. In addition, or in the alternative, presentation interface 108 may include a printer.

In the exemplary implementation, computing device 100 includes an input interface 110 that receives input from user 114. For example, input interface 110 may be configured to receive selections, requests, credentials, and/or any other type of inputs from user 114 suitable for use with the methods and systems described herein. In the exemplary implementation, input interface 110 is coupled to processor 104 and may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 108 and as input interface 110.

In the exemplary implementation, computing device 100 includes a communication interface 112 coupled to memory 106 and/or processor 104. Communication interface 112 is coupled in communication with a remote device, such as another computing device 100. For example, communication interface 112 may include, without limitation, a wired network adapter, a wireless network adapter, and/or a mobile telecommunications adapter.

Instructions for operating systems and applications are located in a functional form on non-transitory memory 106 for execution by processor 104 to perform one or more of the processes described herein. These instructions in the different implementations may be embodied on different physical or tangible computer-readable media, such as memory 106 or another memory, such as a computer-readable media 118, which may include, without limitation, a flash drive, CD-ROM, thumb drive, floppy disk, etc. Further, instructions are located in a functional form on non-transitory computer-readable media 118, which may include, without limitation, a flash drive, CD-ROM, thumb drive, floppy disk, etc. Computer-readable media 118 is selectively insertable and/or removable from computing device 100 to permit access and/or execution by processor 104. In one example, computer-readable media 118 includes an optical or magnetic disc that is inserted or placed into a CD/DVD drive or other device associated with memory 106 and/or processor 104. In some instances, computer-readable media 118 may not be removable.

Figure 2:
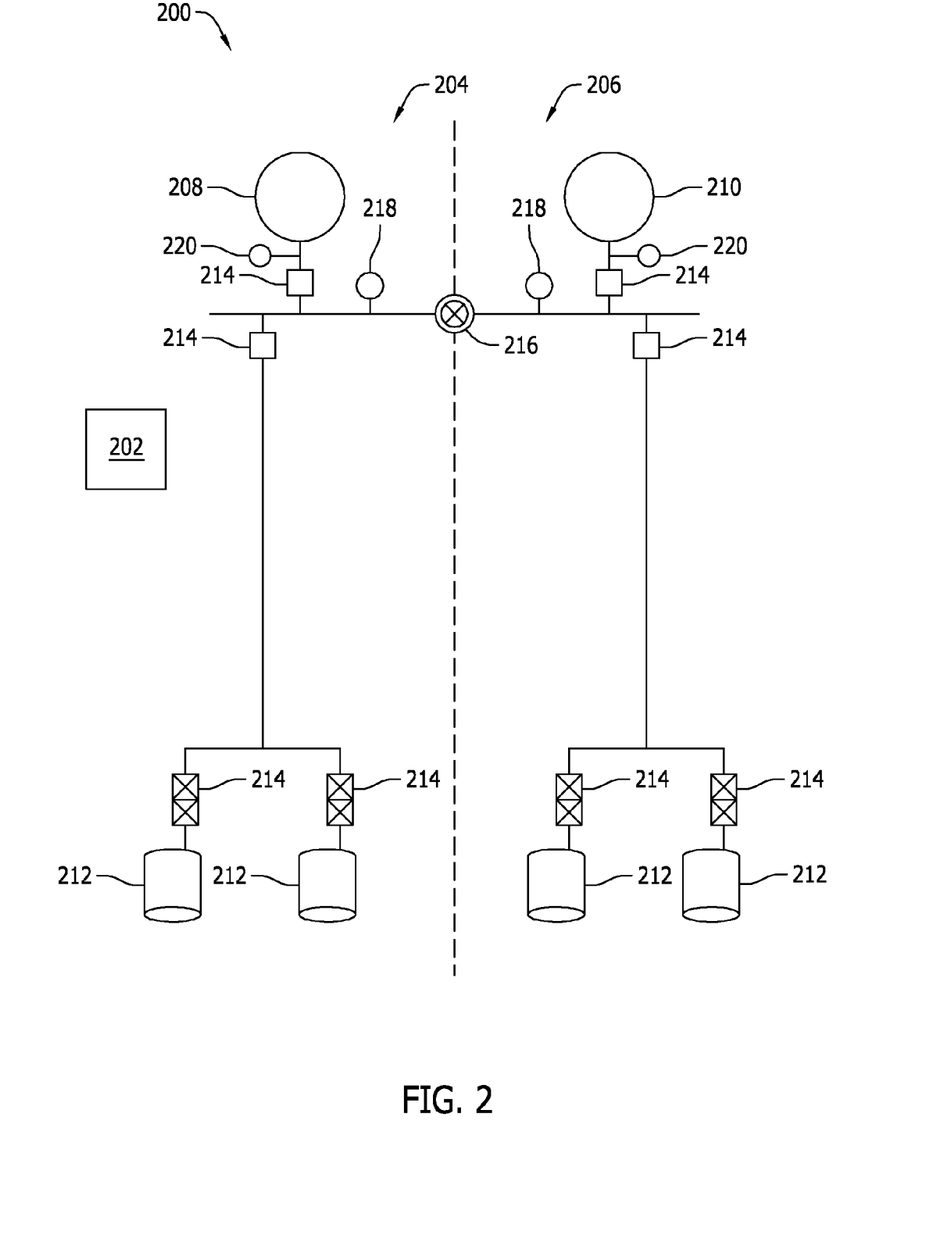
FIG. 2 is a simplified diagram of an exemplary ion propulsion system for use in a satellite.

FIG. 2 is a simplified diagram of a portion of an exemplary ion propulsion system 200. In the exemplary implementation, ion propulsion system 200 is a xenon ion propulsion system that uses xenon as a propellant. In other implementations, system 200 may be any other suitable type of ion propulsion system using any suitable propellant. Moreover, in the exemplary implementation, the ion propulsion system 200 is installed in a satellite (not shown). Alternatively, ion propulsion system 200 may be installed in any suitable spacecraft. A controller 202 controls operation of ion propulsion system 200. Controller 202 may be dedicated solely to controlling ion propulsion system 200 or may also control other components and/or systems in the satellite. Controller 202 controls ion propulsion system 200 to, for example, perform stationkeeping, momentum management, and maintain pointing within on-orbit specifications. In some implementations, controller 202 includes computing device 100 (shown in FIG. 1).

The ion propulsion system 200 is designed with built-in redundancy. Ion propulsion system 200 includes two substantially identical subsystems, first half 204 and second half 206, each of which is capable of performing all of the propulsive functions the satellite. Each half 204 and 206 of ion propulsion system 200 contains its own tank, first tank 208 and second tank 210, storing propellant for ion propulsion system 200. Each half 204 and 206 includes thrusters 212 provided with propellant from tanks 208 and 210. Valves 214 are selectively controlled by controller 202 to direct propellant from tank 208 or 210 to thrusters 212. Pressure sensors 218 and temperature sensors 220 sense the pressure and temperature in tanks 208 and 210. Although the exemplary implementation includes two substantially identical subsystems (i.e., halves 204 and 206), each of which includes two thrusters 212, other implementations may include more substantially identical redundant systems, each of which may include two or more thrusters 212.

Halves 204 and 206 are separated by a latch valve 216. Latch valve 216 provides mechanical sealing between the two halves. When desired, latch valve 216 can be opened to allow transfer of xenon between first tank 208 and second tank 210, thus extending the operational life of the half 204 or 206 that includes tank 208 or 210 that receives xenon from the other tank 210 or 208. The propellant is transferred between tanks 208 and 210 because of a pressure differential between tanks 208 and 210. When latch valve 216 is opened, propellant flows from whichever tank 208 or 210 is at a higher pressure to the tank 210 or 208 that has propellant at a lower pressure. The transfer generally continues until the pressures equalize or the latch valve 216 is closed. In the exemplary implementation, opening and closing latch valve 216 is controlled by controller 202 in response to instruction received from a remote computing device (such as a ground based computing device 100 located operated by a user 114).

As propellant flows out of one tank 208 or 210 across latch valve 216 and into the other tank 210 or 208, various changes occur in the system. Specifically, the pressures in tanks 210 and 208 change, the temperature of the propellant changes, the mass of propellant in each tank 208 and 210 changes, the density of the propellant may change, etc. Careful control of the temperatures is important to prevent damage to latch valve 216 or other components from extremely cold temperatures. Moreover, the temperature of the propellant should be prevented from decreasing below a threshold value at which the propellant changes phase. In the example implementation, for example, the xenon propellant should be maintained above 16.7° C. (62.1° F.) if pressure is allowed to go below 5.841 MPa (847 psia). Below that temperature, xenon will transition to a liquid phase. Moreover, around the threshold, the xenon propellant may exist as both a gas and a liquid, which may complicate determining the mass of propellant transferred between tanks 208 and 210.

Figure 3:
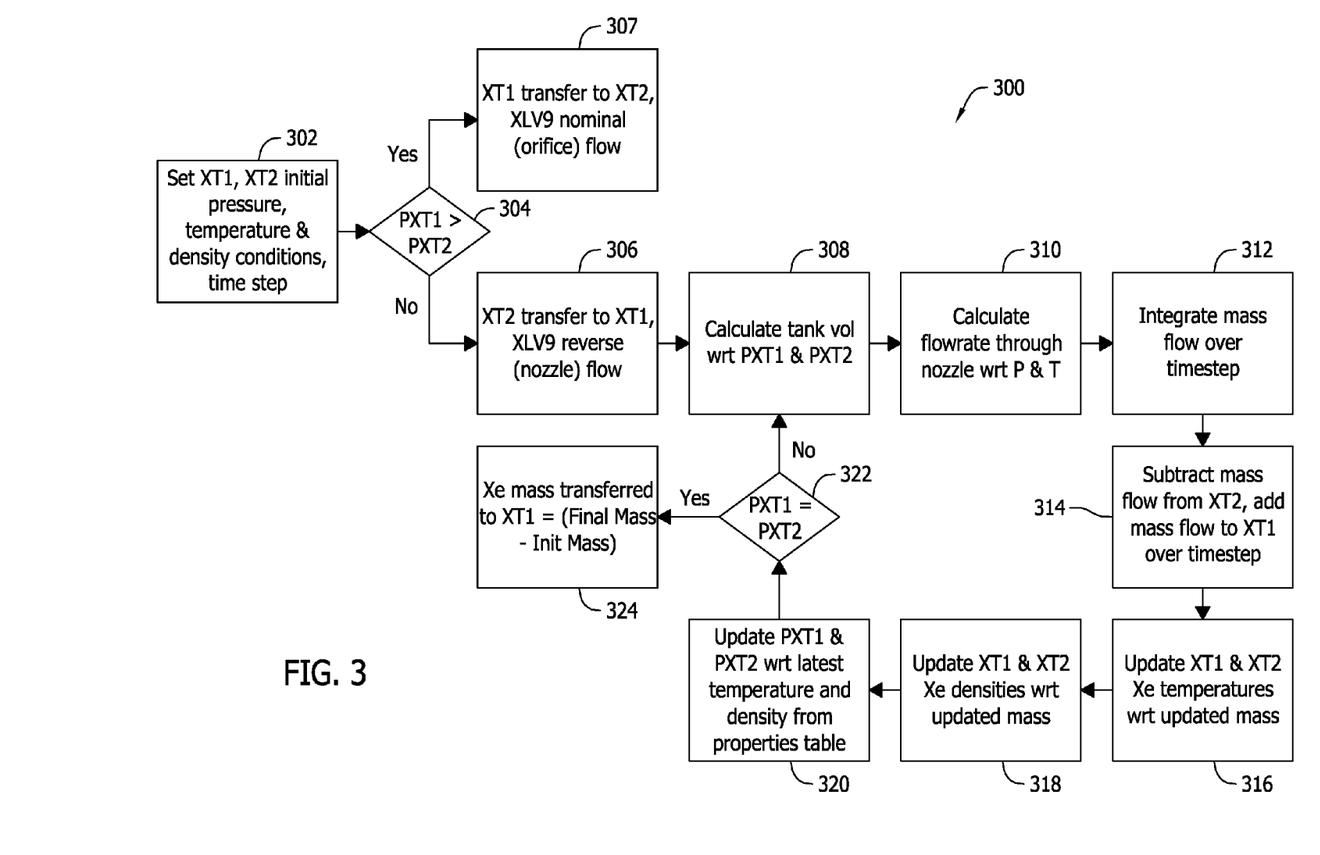
FIG. 3 is a flow diagram of a method for estimating a transfer of propellant between two storage tanks during a transfer event.

FIG. 3 is a flow diagram of a method 300 of estimating a transfer of propellant between two tanks during a transfer event, such as a transfer of xenon between tanks 208 and 210. In the exemplary implementation, method 300 is implemented in a ground based computing device, such as computing device 100. Ground based computing device 100 is in communication (such as via communication interface 112) with the satellite including ion propulsion system 200 to receive sensor data and control latch valve 216 (via controller 202) to transfer propellant between tanks 208 and 210. Alternatively, method 300 may be implemented in controller 202. Moreover, method 300 may be implemented across more than one controller and/or computing device. For example, one or more steps of the method 300 may be performed by controller 202, while one or more other steps may be performed by ground based a computing device 100. In FIG. 3, XT1 is first tank 208, XT2 is second tank 210, XLV9 is latch valve 216, Xe is xenon, PXT1 is the pressure in first tank 208, and PXT2 is the pressure in second tank 210.

There is an initial mass of xenon propellant in each tank 208 and 210. At 302, before a transfer event begins, the initial pressure and temperature are recorded for each of tanks 208 and 210. Computing device 100 receives the pressure and temperature for each tank 208 and 210 from pressure sensors 218 and temperature sensors 220 and stores the initial values to memory device 106. Memory device 106 includes detailed data about properties of the propellant. In the exemplary implementation, the propellant is xenon and the detailed data includes the National Institute of Standards and Technology (NIST) xenon properties table built-in. Computing device 100 determines, from the NIST table, the initial density of the xenon in each tank 208 and 210 based on the known pressure and temperature.

At 302, a timestep for the method 300 is also set. The timestep determines how frequently the instantaneous state of the system 200 is estimated/updated according to the method 300. In the exemplary implementation the timestep is manually selected by the operator/user 114. In other implementations, the timestep may be a preset timestep. The length of the timestep may be any suitable length of time, but is generally significantly less than the expected length of a transfer event to permit multiple estimates to be made during a transfer event. In one implementation, the timestep is five second. In other implementations, the timestep may be on the order of seconds, minutes, or hours. Longer timesteps may reduce accuracy and granularity in the estimation, but also reduce the computational burden on computing device 100.

After the initial values are set at 302, computing device 100 determines, at 304, which tank 208 or 210 contains xenon at a higher pressure. In this example, the pressure of first tank 208 is not greater than the pressure of second tank 210 and method 300 continues to step 306. If the pressure of first tank 208 were greater than the pressure of second tank 210, method 300 would continue to step 307. The remainder of method 300 after step 307 will not be described and, except as noted hereinafter, would be substantially identical the remainder of method 300 described herein.

Figure 4:
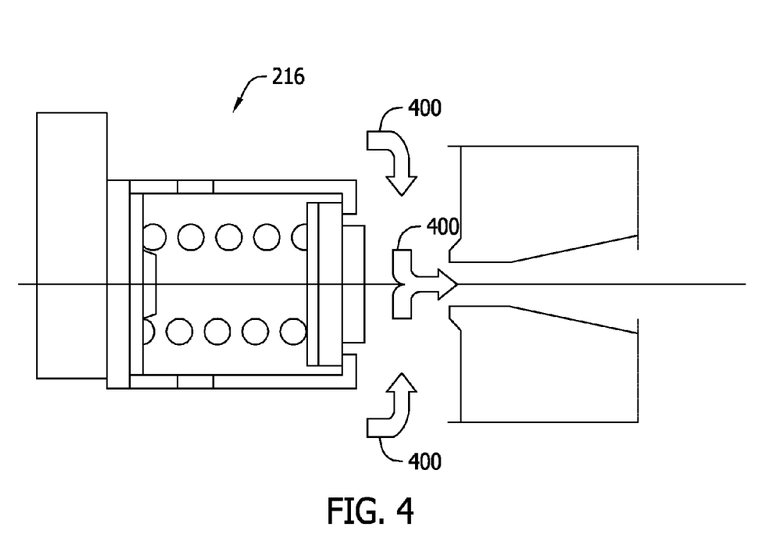
FIG. 4 is a simplified cross-sectional view of a latch valve in the ion propulsion system shown in FIG. 2.
Figure 5:
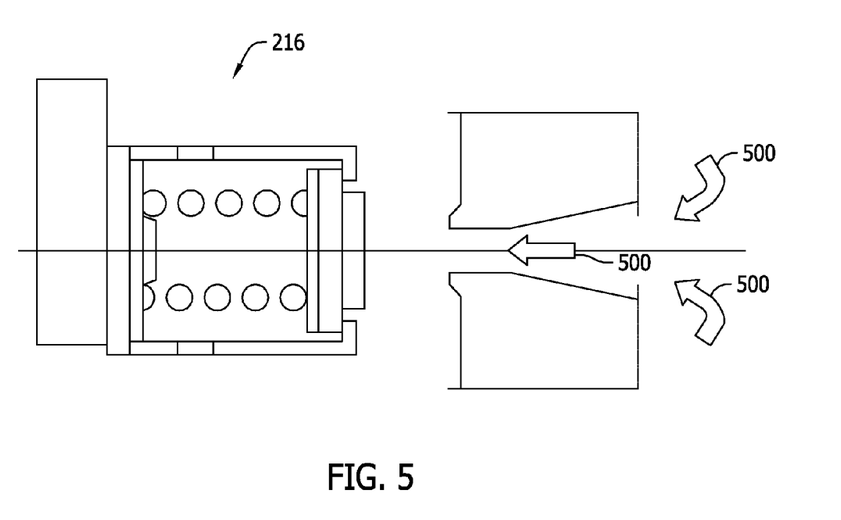
FIG. 5 is another simplified cross-sectional view of a latch valve in the ion propulsion system shown in FIG. 2.

In addition to being needed to identify which tank will be receiving additional xenon and which tank will be losing xenon, the direction of flow of xenon is needed for a proper calculation of the flow rate of the xenon. As mentioned above, when xenon flows between tanks 208 and 210, it flows through valve 216. FIGS. 4 and 5 are simplified cross sections of latch valve 216. The direction of flow through latch valve 216 is indicated by arrow 400 (FIG. 4) and 500 (FIG. 5). Arrows 400 indicate the flow of propellant from first tank 208 to second tank 210. Arrows 500 indicate the flow of propellant from second tank 210 to first tanks 208. As can be seen, latch valve 216 is not symmetrical with respect to the direction of flow through the valve. When propellant is transferred through latch valve 216 from tank 208 to tank 210 (as shown in FIG. 4), the flow through valve 216 is a flow through a sharp edge orifice. When the propellant transfers from tank 210 to tank 208 (as shown in FIG. 5), the flow through valve 216 is flow through a nozzle. The different characteristics of nozzle flow and sharp edge orifice flow are accounted for in determining the characteristics of the flow of propellant between tanks 208 and 210.

At 308, the volume of the xenon propellant in each tank 208 and 210 is calculated based on the initial pressure for each tank 208 and 210. At 310 the flowrate of xenon between tanks 208 and 210 is calculated. The equation used to determine the flow rate of propellant from tank 208 to tank 210 is an orifice/nozzle compressible flow equation. The equation may be expressed as:

$$\dot{w} = C_d A \sqrt{\frac{2g\gamma}{RT(\gamma-1)}} \, P_u \sqrt{PR^{2/\gamma} - PR^{(\gamma+1)/\gamma}} \quad (1)$$

where $\dot{w}$ is the flowrate, $C_d$ is the discharge coefficient, A is the flow area, g is the gravitational constant, $\gamma$ is the specific heat of the gas, R is the gas constant, T is the temperature of the gas, $P_u$ is the upstream pressure, $P_d$ is the downstream pressure, and $\delta P$ is $P_u$ minus $P_d$. In equation (1), PR is:

$$PR = MAX(P_d/P_u, (2/(\delta+1))^{\delta/(\delta-1)}) \quad (2)$$

The difference in direction of flow through latch valve 216 is accounted for in equation (1) in the discharge coefficient $C_d$. For the nozzle flow direction being described (e.g., flow 500 from tank 210 to tank 208 shown in FIG. 5), the discharge coefficient $C_d$ the jet area through the valve is fixed and independent of the ratio of the tank pressures. In the exemplary implementation, the nozzle flow discharge coefficient $C_d$ (including friction losses) is about 0.95. For a sharp edge orifice (e.g., flow 400 in FIG. 4, the path of method 300 not described herein), the discharge coefficient $C_d$ is variable. Specifically, the discharge coefficient varies as the ratio of pressures (i.e. $P_d/P_u$) varies. For latch valve 216, the discharge coefficient $C_d$ in the sharp edge orifice direction varies from 0.62 to 0.87. When the pressure differential between the tanks 208 and 210 is lowest, discharge coefficient $C_d$ is lowest. When the pressure differential is greatest, discharge coefficient $C_d$ is at its greatest. Thus, when first tank 208 has a greater pressure than second tank 210 and method 300 progresses to step 308, discharge coefficient $C_d$ is varied according to the instantaneous pressure ratio $P_d/P_u$ each time the flow rate is calculated.

At 312, the flow rate of equation (1) is integrated over the selected timestep to determine the amount xenon transferred during the timestep. For the first pass through method 300, the first timestep begins when valve 216 is opened (i.e., the beginning of the transfer event). The end of the first timestep is an intermediate time after the beginning of the transfer event and before the end of the transfer event. Each subsequent timestep begins at the end of the prior timestep.

At the end of the timestep, the amount xenon in each tank 208 and 210 at the intermediate time is calculated at 314. The integrated mass flow (i.e., the total mass of xenon that flowed during that timestep) is added to the receiving first tank 208 and subtracted from the giving second tank 210. From 316-320, the temperature, density, and pressure of the xenon in tanks 208 and 210 at the intermediate time are determined based on the updated masses in tanks 208 and 210 and the stored xenon properties in memory 106. These determined values of temperature, density, and pressure are sometimes referred to herein as intermediate values and/or instantaneous values.

Figure 6:
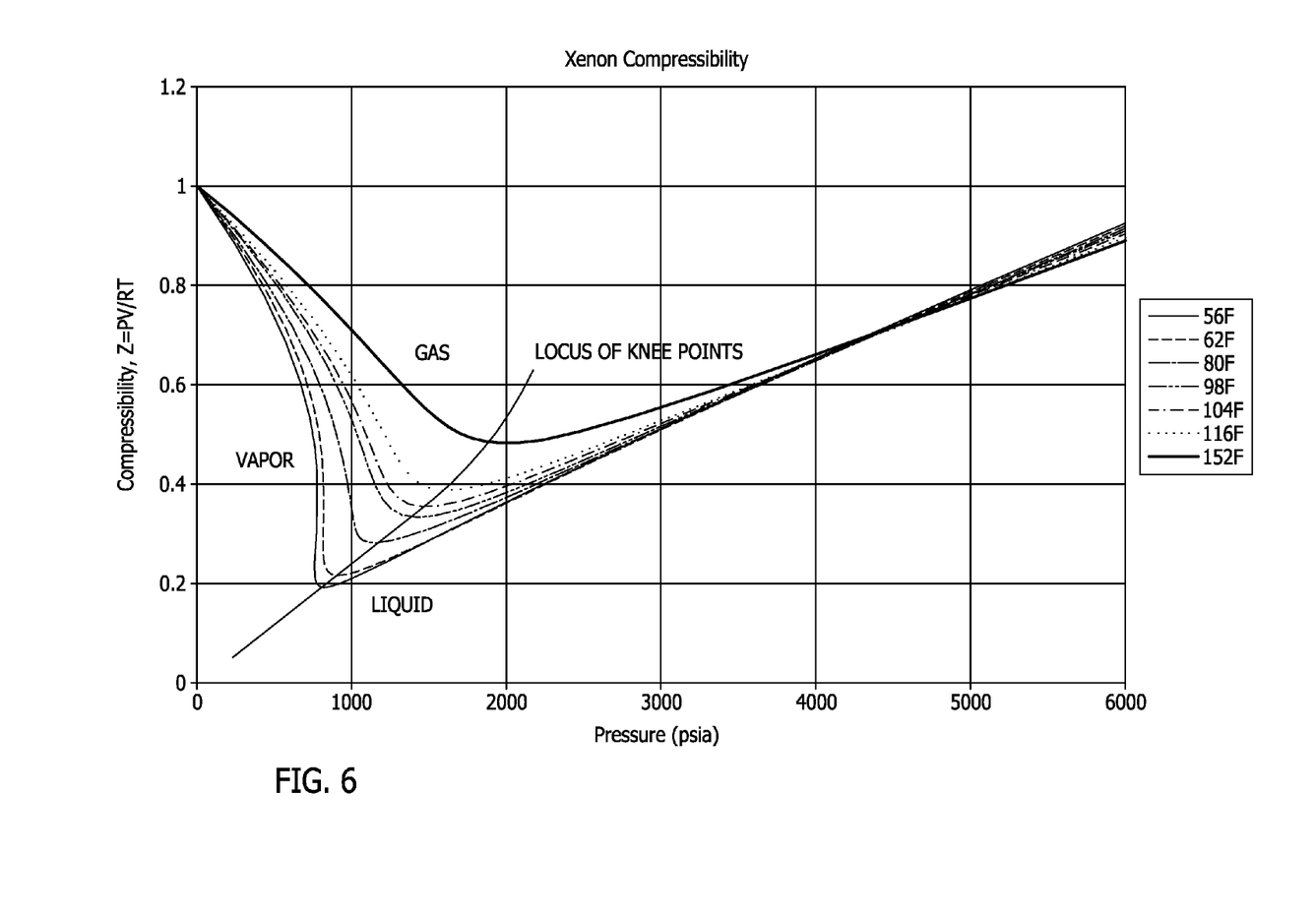
FIG. 6 is a graph of the compressibility of xenon as a function of pressure.
Figure 7:
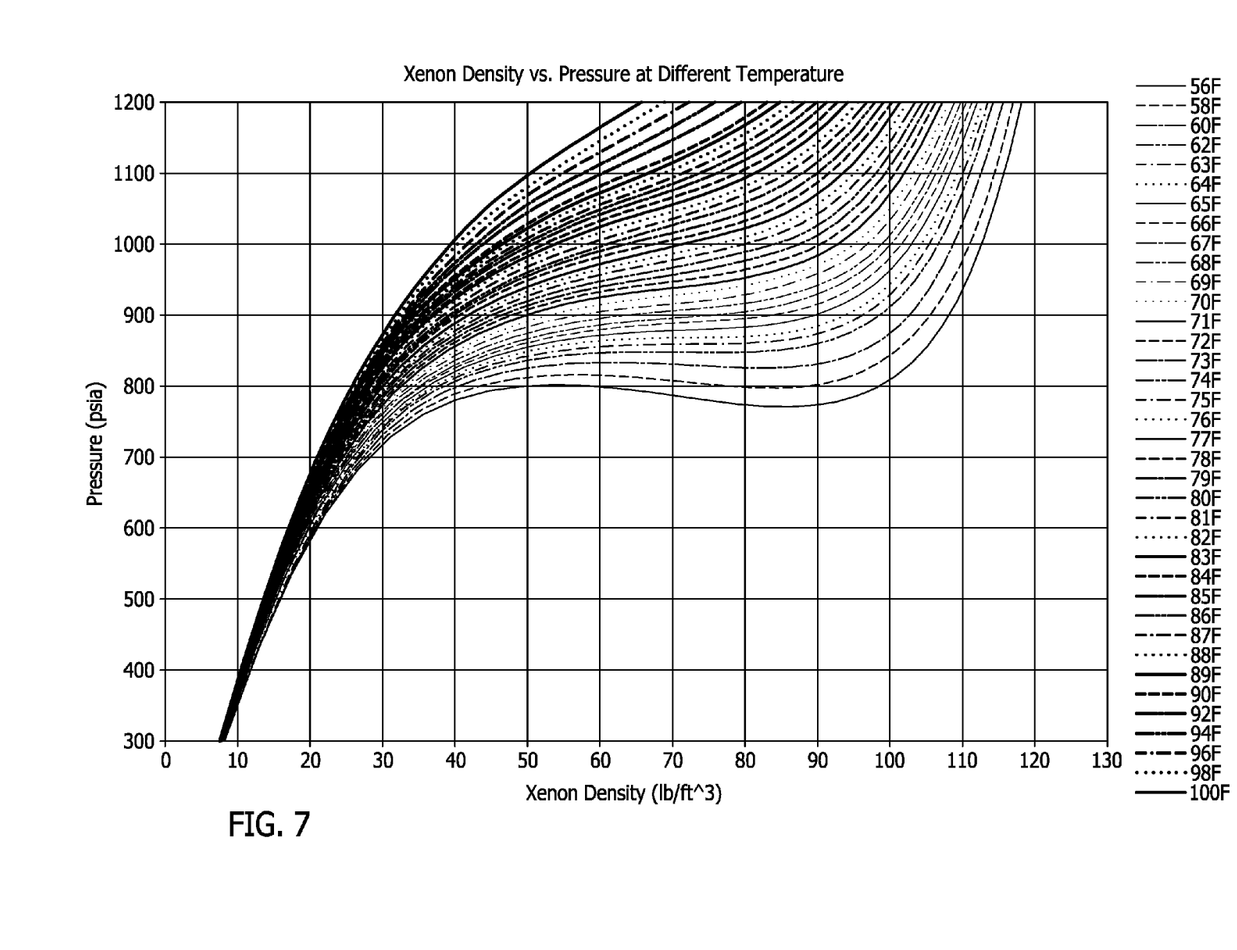
FIG. 7 is a graph of xenon pressure as a function of density at different temperatures, with each curve mathematically represented by a sixth order polynomial equation.

More specifically, computing device 100 updates the density and temperature changes in two tanks 208 and 210 assuming a polytropic condition. A polytropic process is a thermodynamic process that is reversible and obeys the relationship $PV^\delta = C$, where P is the pressure, V is the volume, n, the polytropic index, is any real number, and C is a constant. When the process is of constant temperature (isothermal process), $\delta = 1$. When in the process there is no heat transfer (adiabatic process), $\delta = \gamma$, the ratio of specific heat of the gas. At very low density, all gases and vapors approach ideal gas behavior, with P-V-T relationship being given by the ideal gas equation behavior. The ideal gas equation of state PV=mRT, where m is the mass, R is the gas constant and T is the temperature, is a good approximation at low density. However, at higher densities the behavior deviates substantially from this ideal gas equation of state. The gas equation must then be expressed as that of a compressible substance:

$$PV = mRT^*Z \quad (3)$$

where Z=compressibility factor, (Z=1 for ideal gas). FIG. 6 is a graph of the compressibility factor Z of xenon with respect to pressure. The deviation of Z from unity is a measure of the actual relation from the ideal gas equation of state, and it is substantial for xenon. As described above, computing device 100 includes NIST xenon properties table built-in. These properties include Xenon density vs. pressure at each temperature ranging from 56° F. to 100° F. as shown in FIG. 7. Compressibility is already considered. Method 300 also takes into account that tank volumes vary with pressure changes when mass transfer is calculated. Temperature of tanks 208 and 210 under a polytropic process can be expressed as:

$$\left(\frac{T_2}{T_1}\right) = \left(\frac{P_2}{P_1}\right)^{\frac{\delta-1}{\delta}} \text{ or} \quad (4)$$

$$\left(\frac{T_2}{T_1}\right) = \left(\frac{W_2}{W_1}\right)^{\delta-1} \quad (5)$$

where $1 < \delta < \gamma$. The polytropic coefficients of tanks 208 and 210 are determined by experimentation. For example, data may be collected with a series of opening and closings of latch valve 216 and used to calculate the coefficients. In one implementation the coefficients were determined based on data from five valve open/close sequences with opening times of up to 30 seconds.

Computing device 100 updates the instantaneous density ($Rho_i$) and the instantaneous temperature ($T_i$) with respect to the changed mass in each tank 208 and 210 at 318. Subsequently, at 320, the instantaneous pressure ($P_i$) for the determined $Rho_i$ and $T_i$ can be determined according to:

$$P_i = P_1 + (P_2 - P_1) * \frac{T_1 - T_i}{T_2 - T_i} \quad (6)$$

Equation (6) may also be expressed as:

$$P_i = P_2 * \frac{T_1 - T_i}{T_2 - T_i} + P_1 * \left(1 - \frac{T_1 - T_i}{T_2 - T_i}\right) \quad (7)$$

Moreover, in some implementations, the instantaneous pressure is determined based on the instantaneous density at the instantaneous temperature. These determinations are made using a series of equations, one for each temperature or range of temperatures. The equations are sixth order polynomials that generally take the form of:

$$\text{At } T_i, \; P_i = A(\rho)^6 - B(\rho)^5 + C(\rho)^4 \pm D(\rho)^3 - E(\rho)^2 + F(\rho) \pm G \quad (8)$$

where A, B, C, D, E, F, and G are constants, and $\rho$ is $Rho_i$.

At 322, the intermediate pressure in tanks 208 and 210 are compared to determine if the pressures have equalized. If the pressures have equalized, the transfer of xenon propellant is completed at 324. If the pressures have not equalized, method 300 returns to 308 and steps 308-322 are repeated. The repetition continues until the determined pressures of tanks 208 and 210 are substantially equal.

In some implementations, method 300 also includes a temperature check between step 320 and step 322. After updating the pressure in tanks 208 and 210 at 320, the computing device determines whether the determined temperature for either of tanks 208 and 210 is less than a threshold value. The threshold value in some implementations is a temperature at which the propellant will transition to a liquid plus some safety margin. Additionally, or alternatively, the threshold may be a temperature above a temperature at which one or more components of system 200 might be damaged. If the determined temperature is less than the threshold value, the transfer event is ended and latch valve 216 is closed. If the temperatures remain above the threshold value, method 300 continues to 322.

Although described above as occurring during a transfer event, method 300 may be used to simulate and estimate a transfer event in advance of and/or during an actual transfer event. Thus, for example, an operator may use method 300 to simulate a transfer event based on current temperature, pressure, density, and mass values. By simulating the transfer, the operator may determine how much time a complete transfer (e.g., until the pressures in tanks 208 and 210 equalize) will require, whether a complete transfer can occur without the temperature dropping too low, how long a transfer event should last to achieve a desired transfer of less than the maximum possible transfer, etc.

In some implementations, method 300 is performed by a controller (such as computing device 100 and/or controller 202) and used to control the transfer event. Upon determining to initiate a transfer event (whether according to a schedule, in response to a received command, etc.), the controller opens latch valve 216 and performs method 300. When the controller determines that the pressures have equalized or the temperature of the propellant in one tank 208 or 210 is too low, the controller closes latch valve 216.

Figure 8:
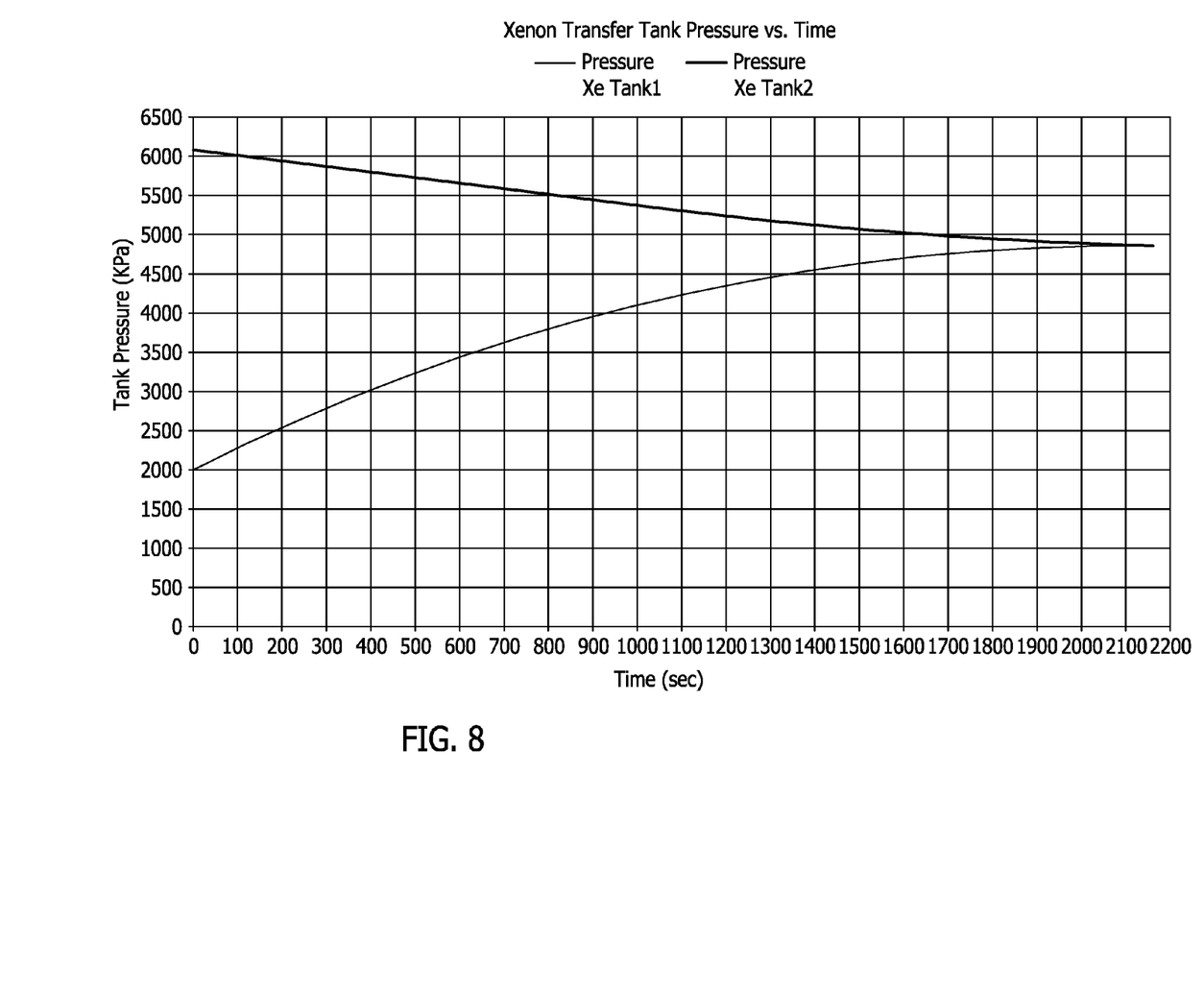
FIG. 8 is a graph of tank pressure as a function of time for a transfer event.
Figure 9:
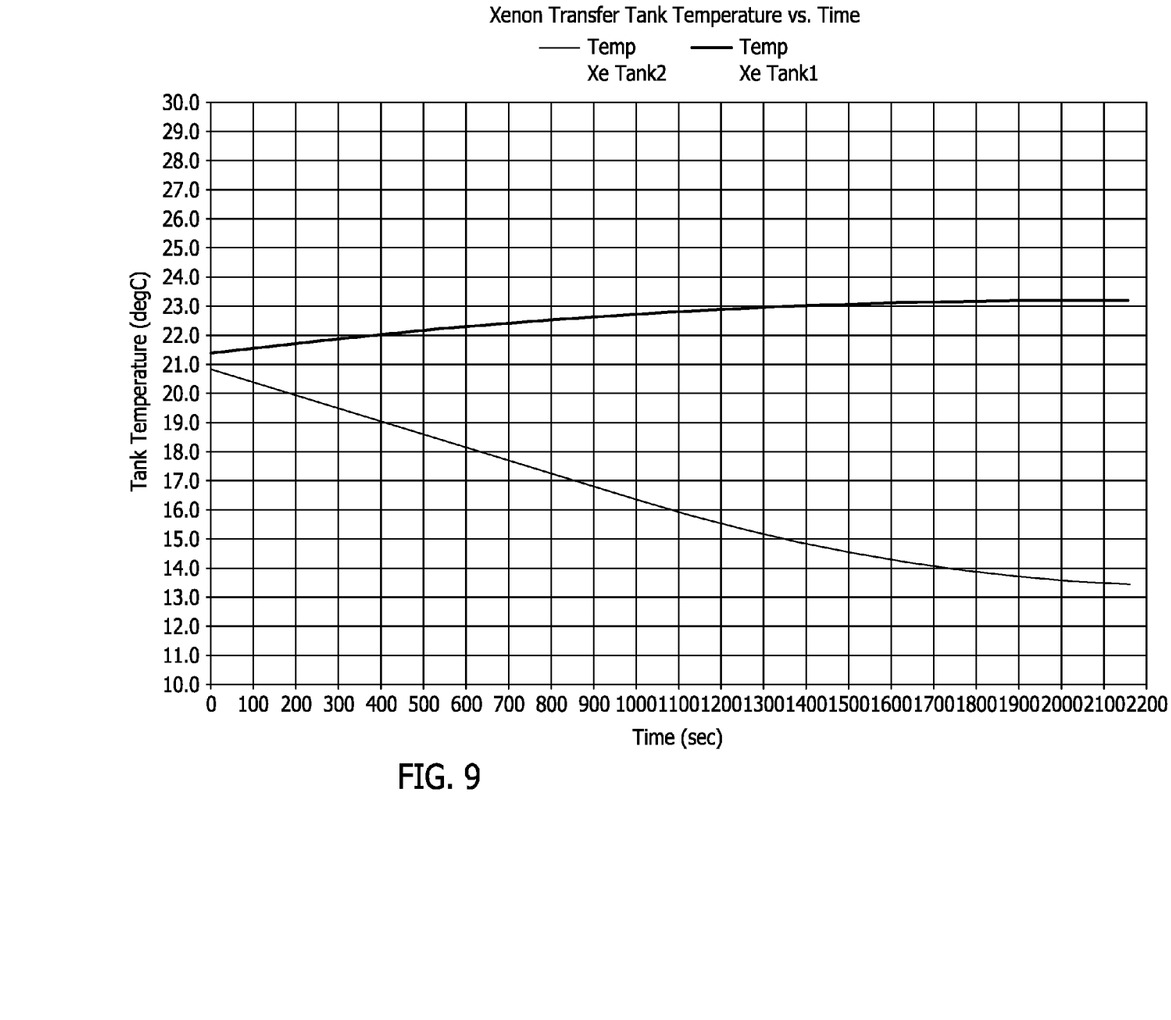
FIG. 9 is a graph of tank temperature as a function of time for a transfer event.
Figure 10:
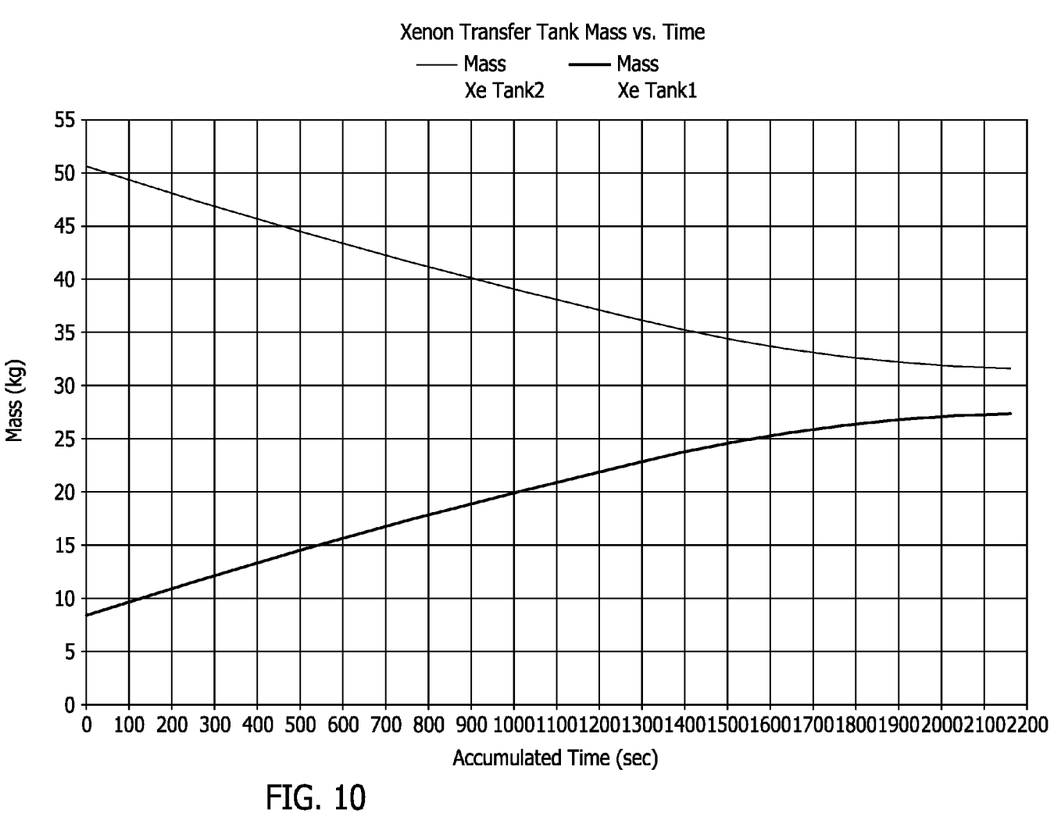
FIG. 10 is a graph of xenon mass in two tanks as a function of time for a transfer event.

FIGS. 8-10 are graphs of tank pressure (FIG. 8), tank temperature (FIG. 9), and mass (FIG. 10) of xenon for tanks 208 and 210 for a simulated transfer event. The data in FIGS. 8-10 were generated by a computing device executing method 300. In FIGS. 8-10, Xe Tank 1 is first tank 208, Xe Tank 2 is second tank 210, and the transfer is from tank 210 to tank 208. As can be seen, a complete transfer event would last approximately 2150 seconds until the pressure in tanks 208 and 210 equalized. As seen in FIG. 9, the temperature of tank 208 (receiving xenon) increased slightly and the temperature of tank 210 (losing xenon) would decrease significantly during the transfer event. At about 900 seconds into the transfer event, the temperature of tank 210 would drop below 16.7° C. (62.1° F.). Beyond that time, the temperature is low enough that the xenon may transition from a gas to a liquid. Accordingly, an actual transfer event would generally be stopped before about 900 seconds to prevent the transition of the xenon gas to a liquid. However, in this case pressure in tank 210 is below 5.841 MPa (847 psia), the critical pressure of Xenon. While there is indication that the gas is below its critical temperature, pressure is below the critical value required at the critical temperature to liquefy a gas. At this combination of temperature and pressure, Xenon remains in gaseous form as shown in FIG. 7. Thus, this method allows the operator to know in real time the state of the fluid, whether it is in single phase or in transition from gas to liquid.

The methods and systems described herein provide an accurate estimate of xenon transfer between two tanks of an ion propulsion system on a continual, real-time basis. The time-step is defined by the user. The constant update of pressure, temperature and density information in the tanks allows the operator to avoid any overly aggressive transfer operation. A prolong discharge of xenon from the giver tank, leading to decompression, may turn xenon into a two phase flow due to fluid temperature dropping too rapidly. By operating the transfer above the critical pressure and temperature conditions, xenon can be kept at gaseous phase only allowing for accurate measurement of xenon transfer. The method uses the orifice or nozzle flow equation for compressible fluid, depending on whether the flow is in the normal or reverse direction of the latch valve. It also accounts for the polytropic behavior of the gas and its surrounding. A built-in xenon properties look-up table allows pressure, temperature and density to be updated in each time-step. Unlike some known methods, the present disclosure accounts for compressibility of propellants, including xenon. The built-in xenon properties tables include information generated from NIST12 that accounts for compressibility. Thus, exemplary systems are able to properly update the instantaneous pressure, temperature and mass changes at each time step.

It should be appreciated that one or more aspects of the present disclosure transform a general-purpose computing device into a special-purpose computing device when configured to perform the functions, methods, and/or processes described herein.

This written description uses examples to disclose various implementations, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for estimating transfer of a propellant between a first half and a second half of an ion propulsion system during a transfer event, said method comprising:
    calculating a flow rate of the propellant through a latch valve based on an initial pressure and an initial temperature of each of a first tank and a second tank for a beginning of the transfer event, where the first half of the ion propulsion system includes the first tank for storing propellant for at least one thruster in the first half of the ion propulsion system, the second half of the ion propulsion system includes the second tank for storing propellant for at least one thruster in the second half of the ion propulsion system, and the latch valve is coupled between the first tank and the second tank;
    calculating, based at least in part on the flow rate, a mass of propellant transferred through the latch valve over a period of time ending at an intermediate time before an end of the transfer event; and
    determining an intermediate pressure for each of the first tank and the second tank for the intermediate time.

2. The method of claim 1, further comprising:
    calculating an intermediate mass of propellant in each of the first tank and the second tank for the intermediate time; and determining an intermediate density for the propellant in each of the first tank and the second tank for the intermediate time.

3. The method of claim 2, further comprising determining an intermediate temperature for each of the first tank and the second tank for the intermediate time.

4. The method of claim 3, wherein determining an intermediate pressure for each of the first tank and the second tank for the intermediate time is based at least in part on the determined intermediate temperature and the determined intermediate density.

5. The method of claim 1, wherein calculating a mass of propellant transferred through the latch valve comprises integrating the flow rate over the timestep from the beginning of the transfer event to the intermediate time.

6. The method of claim 5, further comprising determining an intermediate mass of propellant in each of the first tank and the second tank for the intermediate time based on the calculated mass of propellant transferred through the latch valve.

7. The method of claim 1, further comprising calculating an intermediate flow rate of the propellant through the latch valve based on the intermediate temperature and the intermediate pressure of the first tank and the second tank.

8. The method of claim 1, further comprising closing the latch valve to end the transfer event if the intermediate temperature of the first tank or the second tank decreases below a threshold value.

9. A system comprising:
a first half and a second half of an ion propulsion system, where the first half of the ion propulsion system includes a first tank for storing propellant for at least one thruster in the first half of the ion propulsion system, the second half of the ion propulsion system includes a second tank for storing propellant for at least one thruster in the second half of the ion propulsion system, and the propellant is transferred between the first half and the second half of the ion propulsion system during a transfer event through a latch valve coupled between the first tank and the second tank;
a memory device storing characteristics of the propellant; and
a processor coupled to said memory device, said processor configured to:
calculate a flow rate of the propellant through the latch valve based on an initial pressure and an initial temperature of each of the first tank and the second tank for a beginning of the transfer event;
calculate, based at least in part on the flow rate, a mass of propellant transferred through the latch valve over a period of time ending at an intermediate time before an end of the transfer event; and
determine an intermediate pressure for each of the first tank and the second tank for the intermediate time.

10. The system of claim 9, wherein said processor is further configured to:
calculate an intermediate mass of propellant in each of the first tank and the second tank for the intermediate time; and
determine an intermediate density for the propellant in each of the first tank and the second tank for the intermediate time.

11. The system of claim 10, wherein said processor is further configured to determine an intermediate temperature for each of the first tank and the second tank for the intermediate time.

12. The system of claim 11, wherein said processor is configured to determine an intermediate pressure for each of the first tank and the second tank for the intermediate time based at least in part on the determined intermediate temperature and the determined intermediate density.

13. The system of claim 9, wherein said processor is configured to calculate the mass of propellant transferred through the latch valve by integrating the flow rate over the period of time ending at the intermediate time.

14. The system of claim 13, wherein said processor is further configured to determine an intermediate mass of propellant in each of the first tank and the second tank for the intermediate time based on the calculated mass of propellant transferred through the latch valve.

15. The system of claim 9, wherein the propellant comprises xenon and the ion propulsion system is a xenon ion propulsion system for a satellite.

16. The system of claim 15, wherein said processor is further configured to close the latch valve to end the transfer event if the intermediate temperature of the first tank or the second tank decreases below a threshold value.

17. A method for estimating transfer of xenon between a first half and a second half of a satellite based xenon ion propulsion system during a transfer event, said method comprising:
(a) calculating a volume of each of a first tank and a second tank based at least in part on a pressure of xenon in each of the first tank and the second tank, where the first half of the xenon ion propulsion system includes the first tank for storing propellant for at least one thruster in the first half of the xenon ion propulsion system, the second half of the xenon ion propulsion system includes the second tank for storing propellant for at least one thruster in the second half of the xenon ion propulsion system, and the latch valve is coupled between the first tank and the second tank;
(b) calculating a flow rate of the xenon through the latch valve based on the pressure and a temperature of the xenon in each of the first tank and the second tank;
(c) integrating the flow rate over a period of time to determine a mass of xenon transferred through the latch valve over a period of time less than a length of the transfer event;
(d) determining a mass of the xenon in each of the first tank and the second tank at an end of the period of time;
(e) determining the density and the temperature of the xenon in each of the first and second tanks at the end of the period of time; and
(f) determining the pressure of the xenon in each of the first tank and the second tank at the end of the period of time.

18. The method of claim 17, further comprising repeating steps (a)-(f) at least one time.

19. The method of claim 17, further comprising repeating steps (a)-(f) until the temperature of the xenon in either of the first and second tanks decreases below a threshold.

20. The method of claim 17, further comprising repeating steps (a)-(f) until the pressures of the xenon in the first and second tanks are substantially equal.

* * * * *

UNITED STATES PATENT AND TRADEMARK OFFICE
CERTIFICATE OF CORRECTION

PATENT NO. : 9,546,892 B2
APPLICATION NO. : 14/051123
DATED : January 17, 2017
INVENTOR(S) : Kwok It is certified that error appears in the above-identified patent and that said Letters Patent is hereby corrected as shown below:

In Column 7, Line 15, delete "$PR=MAX(P_d/P_u,(2/\delta+1))^{\delta/(\delta-1)}$" and insert therefor -- $PR=MAX(P_d/P_u, (2/\gamma+1))^{\gamma/(\gamma-1)}$ --.

Signed and Sealed this
Twelfth Day of June, 2018

Andrei Iancu
*Director of the United States Patent and Trademark Office*